Patented Oct. 29, 1940

2,219,873

UNITED STATES PATENT OFFICE 2,219,873

PROCESS FOR THE MANUFACTURE OF ARALIPHATIC CHLOROMETHYL COMPOUNDS

Walter Pinkernelle, Krefeld-Uerdingen, Germany, assignor to I. G. Farbenindustrie Aktiengesellschaft, Frankfort-on-the-Main, Germany No Drawing. Application December 14, 1938, Serial No. 245,651. In Germany May 18, 1937

9 Claims. (Cl. 260—649)

This invention relates to a process for the manufacture of araliphatic chloromethyl compounds.

It is known to convert aromatic and araliphatic hydrocarbons by means of formaldehyde and hydrochloric acid or paraformaldehyde, zinc chloride and hydrogen chloride or paraformaldehyde, concentrated sulphuric acid and hydrogen chloride into the corresponding chloromethyl compounds. With the application of paraformaldehyde hitherto in order to prevent the formation of dichloromethyl compounds a large excess of the hydrocarbon was employed. There was thereby obtained a mixture of the hydrocarbon, the mono-chloromethyl compound and the dichloromethyl compound. In the case of the higher molecular araliphatic hydrocarbons this mixture is difficult to separate since the compounds produced only differ very little from one another as regards boiling point. In addition during the distillation of the higher molecular chloromethyl compounds even in high vacuum decomposition takes place with splitting off of hydrogen chloride.

According to the present invention araliphatic hydrocarbons which contain one or more straight or branched alkyl radicles whereby at least one of these radicles comprises more than two carbon atoms and which do not react with aqueous formaldehyde and hydrochloric acid can be converted with hydrogen chloride in the presence of zinc chloride or concentrated sulphuric acid or other catalysts acting in an equivalent manner in very good yields into the mono-chloromethyl compounds, if an excess of paraformaldehyde is employed. In this case only small quantities of unchanged hydrocarbon remain. Especially those hydrocarbons are to be found suitable which contain in the aliphatic radicles more than five carbon atoms all together. Only by way of example and without restricting the invention thereto I mention as araliphatic hydrocarbons lying within the scope of my invention the isopropyl-benzene, the di- and the triisopropyl-benzene, the isobutyl-p-cymene, the di- and the triisopropyl-naphthalene, the di-isohexyl-naphthalene, the iso- and the n-dodecyl-naphthalene and the n-octadecyl-naphthalene.

It would have been assumed that in this process several chloromethyl radicles would enter the aromatic nucleus which, however, practically is not the case. A further technical advantage of this process consists in that the chloromethyl compounds obtained are produced in such a degree of purity that a distillation, which in most cases causes splitting off of hydrogen chloride, is unnecessary and the crude products can be directly employed for further reactions.

The reaction temperature may vary according to the conditions. I have obtained good results at temperatures from room temperature to about 100° C. and especially from about 50° to about 80° C., the upper limit being given by the decomposition point of the reaction components. The time of heating required depends from the special nature of the compounds employed and obtained and of the temperature degree employed.

The zinc chloride employed can be used several times. When the activity decreases it can be regenerated by dehydration in vacuum.

The chloromethyl compounds of this invention may be employed for many purposes, for example for the manufacture of synthetic resins and lacquers. Furthermore esters may be obtained from the chloro compounds by reacting upon these compounds with alkali salts of organic acids, for example valeric acid, benzoic acid and salicylic acid. The esters obtained in this manner are especially suitable as solvents or softening agents in the manufacture of nitrocellulose lacquers.

The following examples will further illustrate the invention; but the invention is not restricted thereto. The parts are by weight:

Example 1

Hydrogen chloride is passed into a mixture of 408 parts of tri-isopropyl-benzene, 120 parts of paraformaldehyde and 100 parts of zinc chloride at 60–75° C. with stirring for four hours. The upper colorless oil layer is decanted, washed with a little water and may be distilled. At 142–147° C. under 10 mm. mercury gauge about 450 parts of a colorless oil pass over which is proved to be pure tri-isopropyl-benzylchloride.

Example 2

Hydrogen chloride is passed into a mixture of 190 parts of isobutyl-p-cymene, obtained by the action of n-butylene on p-cymene in the presence of aluminium chloride, 90 parts of paraformaldehyde and 70 parts of zinc chloride at 65° C. with stirring for seven hours. The upper layer, weighing 198 parts, is decanted and washed with water. The oil may be distilled and passes over at 142–145° C. under 11 mm. mercury gauge.

Example 3

Hydrogen chloride is passed into a mixture of 254 parts of isononyl-naphthalene, 50 parts of paraformaldehyde and 50 parts of zinc chloride at 60–70° C. with stirring for three hours. After decanting, washing with water and drying there remain about 275 parts of a light brown viscous oil. The chloromethyl-isononyl-naphthalene shows a boiling point of 170–175° C. under 1 mm. mercury gauge and gives thereby a yellow viscous oil. Only little portions can be distilled without decomposition.

Example 4

Hydrogen chloride is passed into a mixture of 212 parts of di-isopropyl-naphthalene, obtained by the action of propylene on naphthalene in the presence of boron fluoride dihydrate, 45 parts of paraformaldehyde and 45 parts of zinc chloride at 60–70° C. with stirring for about 2½ hours. The reaction product is washed with water. After drying there remain about 225 parts of a light brown oil which proves to be practically pure mono-chloromethyl - di - isopropyl - naphthalene and which is not distillable.

Example 5

Hydrogen chloride is passed into a mixture of 296 parts of iso-dodecyl-naphthalene, 55 parts of paraformaldehyde and 50 parts of zinc chloride at 60–70° C. with stirring for three hours. The reaction product is washed with water. After drying there remain about 320 parts of a brown viscous oil, the mono-chloromethyl-iso-dodecyl-naphthalene. A sample boils at 185–200° C. under 3 mm. mercury gauge.

Example 6

Hydrogen chloride is passed into a mixture of 296 parts of n-dodecyl-naphthalene, 55 parts of paraformaldehyde and 50 parts of zinc chloride at 60–70° C. with stirring for three hours. The working up of the reaction product takes place in the same manner as in Example 5 and gives 315 parts of crude product which is a brown viscous oil and contains about 60–70% of mono-chloromethyl - n - dodecyl - naphthalene which boils at 210–220° C. under 1 mm. mercury gauge.

I claim:

1. Process for the manufacture of an araliphatic mono-chloromethyl compound which comprises reacting hydrogen chloride and an excess of paraformaldehyde upon an araliphatic hydrocarbon, the aliphatic portion of which consists of at least one alkyl radicle with more than two carbon atoms, in the presence of a catalyst selected from the group consisting of zinc chloride and concentrated sulphuric acid.

2. Process for the manufacture of an araliphatic mono-chloromethyl compound which comprises reacting hydrogen chloride and an excess of paraformaldehyde upon an araliphatic hydrocarbon, carrying in its side chains more than five carbon atoms and the aliphatic portion of which consists of at least one alkyl radicle with more than two carbon atoms, in the presence of a catalyst selected from the group consisting of zinc chloride and concentrated sulphuric acid.

3. Process for the manufacture of tri-isopropyl-benzylchloride which comprises reacting hydrogen chloride and an excess of paraformaldehyde upon tri-isopropyl-benzene in the presence of zinc chloride.

4. Process for the manufacture of mono-chloromethyl-iso-dodecyl-naphthalene which comprises reacting hydrogen chloride and an excess of paraformaldehyde upon iso-dodecyl-naphthalene in the presence of zinc chloride.

5. Process for the manufacture of mono-chloromethyl-n-dodecyl-naphthalene which comprises reacting hydrogen chloride and an excess of paraformaldehyde upon n-dodecyl-naphthalene in the presence of zinc chloride.

6. An araliphatic monochloromethyl compound substituted by one monochloromethyl radical in which the aliphatic portion consists of at least one alkyl radical with more than 2 carbon atoms, more than 5 carbon atoms being present in said aliphatic portion.

7. Tri-isopropyl-benzylchloride consisting of a colorless oil boiling at 142–147° C. under 10 mm. mercury gauge.

8. Mono-chloromethyl-iso-dodecyl-naphthalene consisting of a viscous oil boiling at 185–200° C. under 3 mm. mercury gauge.

9. Mono-chloromethyl-n-dodecyl-naphthalene consisting of a viscous oil boiling at 210–220° C. under 1 mm. mercury gauge.

WALTER PINKERNELLE.